United States Patent
Oohashi

(10) Patent No.: US 8,342,278 B2
(45) Date of Patent: Jan. 1, 2013

(54) POWER SOURCE SUPPORTING MECHANISM FOR VEHICLE

(75) Inventor: Satoshi Oohashi, Shizuoka (JP)

(73) Assignee: Yamaha Hatsudoki Kabushiki Kaisha, Iwata-shi (JP)

( * ) Notice: Subject to any disclaimer, the term of this patent is extended or adjusted under 35 U.S.C. 154(b) by 699 days.

(21) Appl. No.: 12/318,830

(22) Filed: Jan. 9, 2009

(65) Prior Publication Data

US 2009/0178868 A1  Jul. 16, 2009

(30) Foreign Application Priority Data

Jan. 10, 2008 (JP) ................................. 2008-002866

(51) Int. Cl.
*B60R 16/04* (2006.01)
(52) U.S. Cl. ........................ 180/68.5; 320/112; 320/113
(58) Field of Classification Search ................. 180/68.5; 320/112, 113
See application file for complete search history.

(56) References Cited

U.S. PATENT DOCUMENTS

| 3,370,987 | A | * | 2/1968 | Rush | 429/98 |
| 5,059,885 | A | * | 10/1991 | Weiss et al. | 320/115 |
| 5,484,667 | A | * | 1/1996 | Sahli et al. | 429/100 |
| 5,570,752 | A | * | 11/1996 | Takata | 180/206.4 |
| 6,400,122 | B1 | * | 6/2002 | Iwamura | 320/107 |
| 7,117,966 | B2 | * | 10/2006 | Kohda et al. | 180/68.5 |

FOREIGN PATENT DOCUMENTS

| JP | 10-316068 | 12/1998 |
| JP | 2007-320533 | * 12/2007 |

* cited by examiner

*Primary Examiner* — Jeffrey J Restifo
*Assistant Examiner* — Erez Gurari
(74) *Attorney, Agent, or Firm* — Rabin & Berdo, P.C.

(57) ABSTRACT

Structures of a supporting mechanism for a power source in a vehicle can include a seat portion and a fixing portion. The seat portion can be attached to a body of the vehicle. The fixing portion can extend from the seat portion. One or more stackable power sources can be accommodated within and secured by the fixing portion. The power source supporting mechanism can be easily mounted in available space in or on or otherwise associated with the vehicle, enabling the power source supporting mechanism to be readily adaptable to various different kinds of vehicles. The vehicles may be motorcycles, for example.

24 Claims, 3 Drawing Sheets

Figure 1:
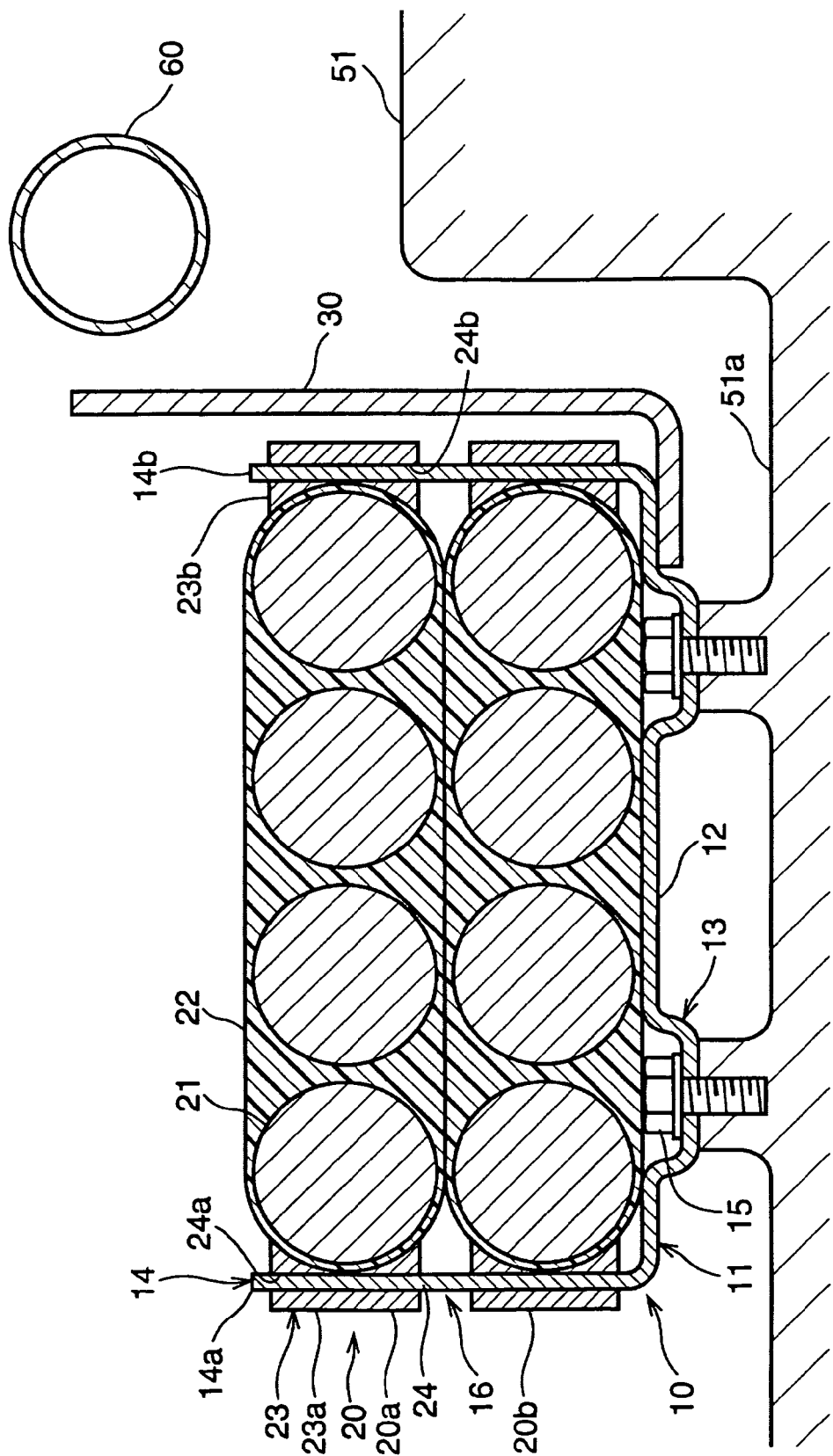

POWER SOURCE SUPPORTING MECHANISM FOR VEHICLE

CROSS-REFERENCE TO RELATED APPLICATIONS

This application claims priority under 35 U.S.C. §119 from Japanese Patent Application No. 2008-002866, filed Jan. 10, 2008, the entirety of which is incorporated herein by reference.

TECHNICAL FIELD

Embodiments of the present invention relate to a power source supporting mechanism for a vehicle, for example, a motorcycle.

BACKGROUND ART

In recent years, the number of electrical components installed in a typical motorcycle has increased, due for example to the employment of electronic fuel injection systems or the like in the motorcycle. Accordingly, the need for installing a power source able to supply the increased number of electrical components in the motorcycle has also increased. Japanese Patent No. 3482816, for example, discloses an arrangement for the installation of a high capacity battery in a motorcycle.

SUMMARY OF THE INVENTION

Embodiments of the present invention relate to structures of a supporting mechanism for a power source in a vehicle. The vehicle can be a straddle-type vehicle, such as a motorcycle. The power source supporting mechanism can be readily adaptable to various different kinds of motorcycles.

More particularly, embodiments of a power source supporting mechanism according to the invention can include a seat portion and a fixing portion. The seat portion can be attached to a body of a motorcycle. The fixing portion can extend from the seat portion. One or more power sources can be accommodated within and secured by the fixing portion.

For example, a plurality of power sources can be stacked in and fixed to the fixing portion. The number of power sources held by the fixing portion can be adjusted to meet a required power capacity of a given motorcycle, and the power source supporting mechanism can be provided within available space on or in a motorcycle body or frame. Thus, the power source support mechanism can be easily adjusted for use with various different kinds of motorcycles.

BRIEF DESCRIPTION OF THE DRAWINGS

FIG. 1 is a cross-sectional view, taken along the line 1-1 (see FIG. 3) of a power source supporting mechanism according to embodiments of the invention;

FIG. 2 is a perspective view of the power source supporting mechanism and associated battery assemblies, with batteries shown in phantom; and FIG. 3 is a left side view of a motorcycle having the power source supporting mechanism mounted thereon.

DETAILED DESCRIPTION OF THE INVENTION

The invention will now be described in more detail by way of example with reference to the embodiments shown in the accompanying Figures. It should be kept in mind that the following described embodiments are only presented by way of example and should not be construed as limiting the inventive concept to any particular physical configuration. It should further be understood that "exemplary" as used herein means "serving as an example, instance or illustration." Any aspect referred to herein as "exemplary" is not necessarily to be construed as preferred over other aspects.

Further, if used and unless otherwise stated, the terms "upper," "lower," "front," "back," "over," "under," and similar such terms are not to be construed as limiting the invention to a particular orientation. Instead, these terms are used only on a relative basis.

Moreover, any term of degree used herein, such as "substantially", "essentially" and "nearly", means a reasonable amount of deviation of the modified word is contemplated such that the end result is not significantly changed. For example, such terms can be construed as allowing a deviation of at least 5% of the modified word if this deviation would not negate the meaning of the word the term of degree modifies.

Referring to FIG. 1, a power source supporting mechanism 10 according to an exemplary embodiment can be designed for mounting a plurality of battery assemblies as a power source on a vehicle, for example a straddle-type vehicle such as a motorcycle. The power source supporting mechanism 10 can include a seat portion 11 and a fixing portion 16. The seat portion 11 can be attached to a vehicle body, as described in more detail further on. The seat portion 11 can include a seat portion body 12 and tightened or attachment portions 13. As shown in FIG. 1 and FIG. 2, in a mounted or attached position, the tightened or attachment portions 13 can project toward the vehicle, for example, toward an upper surface 51*a* of a crankcase 51 of the vehicle. The tightened or attachment portions 13 can be attached or fastened, e.g., tightened by way of bolts 15, to the crankcase 51 of the vehicle, such as a motorcycle 1 (see FIG. 3).

The fixing portion 16 can extend from the seat portion 11. The fixing portion 16 can be integral or contiguous with the seat portion 11, or be connected to the seat portion 11. One or more power sources can be received or accommodated by or within and secured by the fixing portion 16. For example, a plurality of stacked battery assemblies 20 can be fixed to the fixing portion 16.

The fixing portion 16 can include an engaging projection 14. The engaging projection 14 can include a first engaging projection 14*a* and a second engaging projection 14*b*. The engaging projections 14*a*, 14*b* can project from the seat portion 11 toward the battery assemblies 20. More specifically, the engaging projections 14*a*, 14*b* can be substantially perpendicular or at right angles to the seat portion 11. In a mounted position, the engaging projections 14*a*, 14*b* can project upward or vertically from the seat portion 11, where "upward" or "vertically" refers, for example, to a direction substantially parallel to an up-and-down direction with reference to the ground. For example, the engaging projections 14*a*, 14*b* can be substantially perpendicular or orthogonal to a mounting surface, such as the upper surface 51*a*, and project vertically when the motorcycle 1 is in a substantially upright position as illustrated in FIG. 3. Herein, "upward" and "vertical," "vertically" or "vertical direction" may each refer to substantially the same direction.

The engaging projections 14*a*, 14*b* can be arranged at respective end portions of the seat portion 11, and project in a direction substantially parallel to a stacking direction of the battery assemblies 20. The engaging projections 14*a*, 14*b* can be spaced apart from each other in a substantially horizontal or widthwise or vehicle width direction (e.g., a direction substantially orthogonal or transverse to the upward or vertical direction described above). The first engaging projection 14a can be arranged at a left end of the seat portion 11 in the widthwise direction. The second engaging projection 14b can be arranged at a right end of the seat portion 11 in the widthwise direction. Here, "left" and "right" can refer, for example, to a view as in FIG. 1, which may correspond to left and right from the perspective of a rider sitting on a motorcycle 1 (see FIG. 3) and facing forward toward a front wheel 45.

A length of the engaging projection 14 from a proximal end (e.g., an end closest to a mounting surface such as surface 51a) to a distal end (e.g., the other end from the proximal end) is not limited to any particular length. For example, the length of the engaging projection 14 from the proximal end to the distal end may be set according to the number of the battery assemblies 20 to be mounted on the motorcycle 1. For example, when mounting the two battery assemblies 20 on the motorcycle 1 as illustrated in FIG. 1, the length of the engaging projection 14 may be set to a value about two times a thickness of the battery assembly 20.

Figure 2:
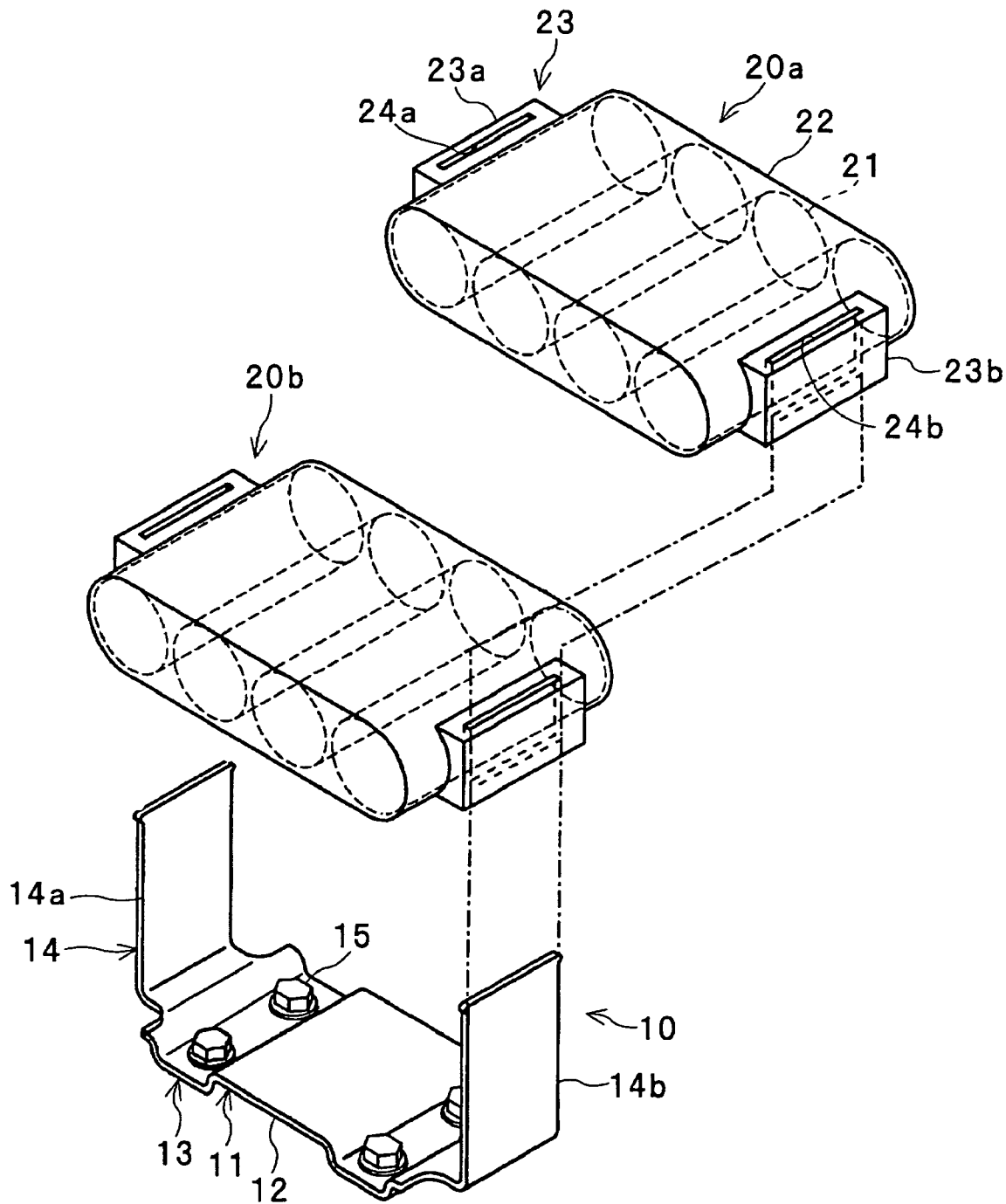

As shown in FIG. 1, one or more battery assemblies can be attached to the power source supporting mechanism 10. For example, two battery assemblies 20a, 20b can be attached to the power source supporting mechanism 10. The battery assembly 20a and the battery assembly 20b can have substantially the same shape. The battery assemblies 20 can include a plurality of batteries 21. In the exemplary embodiment described herein and illustrated in the accompanying figures, a battery 21 has a substantially columnar or cylindrical shape. The plurality of batteries 21 can each be arranged in or aligned along a same direction. For example, the plurality of batteries 21 can be arranged in parallel to each other along a vehicle width direction (e.g. a direction as illustrated in FIG. 1, substantially parallel to a horizontal or widthwise direction as described above). The plurality of batteries 21 can be formed into a panel or block or group of batteries, as in an assembly 20, for example, by being grouped into an integral mold with a molding material 22 as shown in FIG. 2. The molding material 22 can be a resin, for example.

Referring now to FIG. 2, the plurality of batteries 21 can include an engaging portion 23 formed on or attached thereto. Specifically, the plurality of batteries 21 can include one or more engaging portions, such as two engaging portions 23a, 23b formed on or attached to respective ends of the plurality of batteries 21. The first engaging portion 23a can be formed on or attached to one end portion of the plurality of batteries 21. The first engaging portion 23a can include a portion that, when the plurality of batteries 21 are mounted by the power source supporting mechanism 10 on a vehicle, extends at least partly in a substantially vertical direction as described previously, and that extends at least partly in a direction substantially perpendicular or orthogonal to the vertical direction, e.g., substantially parallel to a long axis of a cylindrical shape of a battery 21. The second engaging portion 23b can be formed on or attached to the other end portion of the plurality of batteries 21 and extend in the same or similar directions as the first engaging portion 23a. Specifically, the first engaging portion 23a and the second engaging portion 23b can be formed on or attached to a right end and a left end of the plurality of batteries 21, respectively.

The engaging portions 23a, 23b can have respective engaging holes or slots or openings 24a, 24b formed therein. The engaging holes or slots or openings 24a, 24b can have substantially a same shape as an outline of the engaging projection 14. As shown in FIGS. 1 and 2, a battery assembly 20a or 20b formed into a block can be sized to fit the seat portion 11 and between the engaging projections 14a, 14b, while the engaging portions 23a, 23b extend beyond the engaging projections 14a, 14b. The first engaging projection 14a can be inserted into and be accommodated or received by or fit within the first engaging hole or slot or opening 24a, and the second engaging projection 14b can be inserted into and be accommodated or received by or fit within the second engaging hole or slot or opening 24b. The battery assemblies 20 can be attached or secured to the power source supporting mechanism 10 by way of engagement of the first and second engaging holes or slots or openings 24a, 24b with the first and second engaging projections 14a, 14b. When in place in the power supporting mechanism 10 the battery assemblies 20 can fit and be supported by the seat portion 11.

As shown in FIG. 1, a heat-shielding member 30 can be attached to the power source supporting mechanism 10. The heat-shielding member 30 can have a shape conforming to an end portion of stacked battery panels or blocks 20, and extend in a direction substantially parallel to the engaging projection 14.

Figure 3:
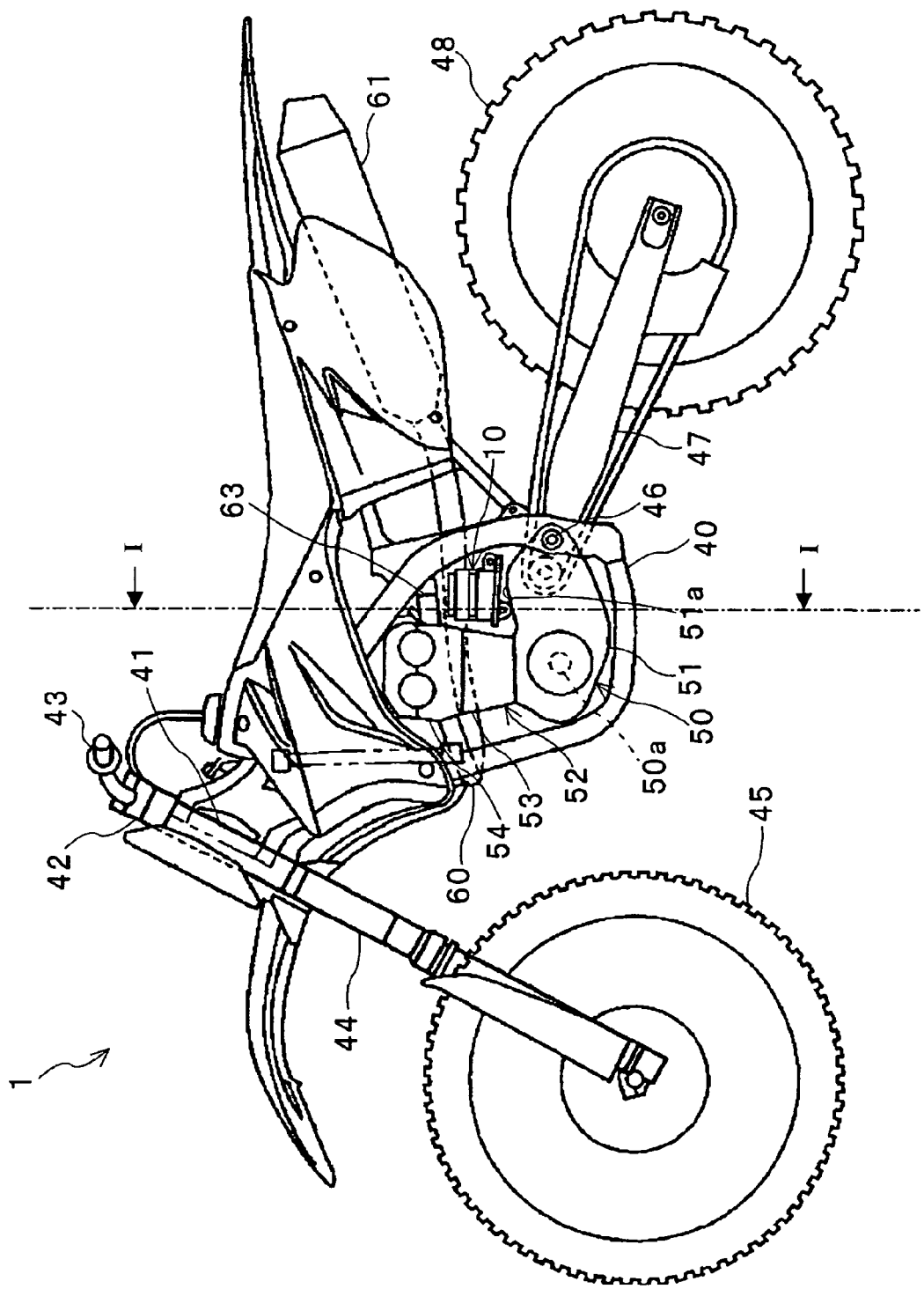

Referring now to FIG. 3, the motorcycle 1 can include a vehicle body frame 40. A steering head pipe 41 can be formed at a front end portion of the vehicle body frame 40. A steering shaft 42 can be rotatably inserted into the steering head pipe 41. A handle 43 can be attached to an upper end of the steering shaft 42. A pair of front forks 44 can be attached to the steering shaft 42. A front wheel 45 can be rotatably supported at a lower end portion of the pair of front forks 44.

A pivot shaft 46 can be attached to a rear end portion of the vehicle body frame 40. A rear arm 47 can be pivotably supported by the pivot shaft 46. A rear wheel 48 can be rotatably supported at a rear end portion of the rear arm 47.

An engine 50 can be suspended by the vehicle body frame 40. The engine 50 can include the crankcase 51 and a cylinder block 52. A crankshaft 50a extending in the vehicle width direction can be arranged in the crankcase 51. The cylinder block 52 includes a cylinder body 53 and a cylinder head 54. The cylinder body 53 can be connected to a front half portion of the crankcase 51. The cylinder head 54 can be attached to an upper end portion of the cylinder body 53.

An exhaust pipe 60 acting at least in part as an air-discharging pipe can be connected to the cylinder head 54. A muffler 61 can be connected to a rear end portion of the exhaust pipe 60. Specifically, the exhaust pipe 60 can be connected to the front side of the cylinder head 54. The exhaust pipe 60 can be directed to the rear via the right side of the cylinder block 52.

The engine 50 can be a fuel-injection engine. It should be understood that embodiments of the invention are not limited with respect to the kind of engine used, and that the use of other kinds of engines is possible. The engine 50 can include a throttle body 63. The throttle body 63 can be arranged above the crankcase 51. The throttle body 63 can be connected to a rear end portion of the cylinder head 54. The throttle body 63 can also be connected to an air cleaner (not shown) acting as an air-intake component.

The power source supporting mechanism 10 can be attached, for example, to the upper surface 51a of the crankcase 51 on the back side of the cylinder block 52. The power source supporting mechanism 10 can be arranged between the throttle body 63 and the crankcase 51. The exhaust pipe 60 can, for example, be positioned on a side of the battery assemblies 20. The heat-shielding member 30 can be arranged between the exhaust pipe 60 and the battery assemblies 20 as shown in FIG. 1.

The above-described positioning of the power source supporting mechanism 10 with respect to other components of the motorcycle 1 is only one illustrative example, and other positions and arrangements are possible. For example, any position which occupies available space on the vehicle body frame 40 can be used.

The power source supporting mechanism 10 as described above provides a number of advantages. For example, as described previously, the power source supporting mechanism 10 can include the fixing portion 16 which is able to secure or fix an adjustable number of the plurality of battery assemblies 20. Therefore, the power source supporting mechanism 10 can enable a number of battery assemblies 20 provided as a power source to be adjusted according to the requirements of the motorcycle 1. Similarly, the power source supporting mechanism 10 can be adjusted to fit within or correspond to a size of available space (also referred to as "dead space") on or in or otherwise associated with the motorcycle 1. Therefore, the power source supporting mechanism 10 be applied to or used with various types of motorcycles. In other words, the power source supporting mechanism 10 has a high general-purpose utility. Therefore, with the employment of the power source supporting mechanism 10, it is not necessary to design a different power source supporting mechanism for each of different types of motorcycle.

For example, when the power source supporting mechanism is used for a motorcycle which requires a high capacity of power source, the capacity can be increased easily by attaching a large number of the battery assemblies 20 in the fixing portion 16.

When the available space associated with the motorcycle is relatively small, arrangement of the power source in the relatively small available space is easily achieved by attaching a correspondingly small number of battery assemblies 20, to reduce the overall size of the battery assemblies 20 and the power source supporting mechanism 10 so as to fit the available space.

In addition, when the motorcycle requires a high-capacity power source but there is not a large, continuous available space associated with the motorcycle, the required capacity can be provided by arranging a plurality of power source supporting mechanisms 10 respectively in a plurality of relatively small available spaces, so that a required number of battery assemblies 20 can be provided.

In this manner, with the power source supporting mechanism 10 according to embodiments of the invention, adjustment of the number of the battery assemblies 20 to be attached is easily achieved. Therefore, provision of a required power source capacity can be achieved regardless of the size of the available space, making the power source supporting mechanism 10 usable with or applicable to various types of motorcycles each requiring a different capacity of power source.

In addition, the battery assemblies 20 can be heavy components. With the provision of the seat portion 11 to allow the battery assemblies 20 to be placed on the seat portion 11 as described above, the battery assemblies 20 can be firmly held in spite of being heavy.

As described above, the fixing portion 16 can include the engaging projection 14, and the battery assemblies 20 can be fixed to or secured by the fixing portion 16 by engagement with the engaging projection 14 of the engaging hole or slot 24 formed in the engaging portion 23 of the batteries 21. Therefore, attachment and detachment of the battery assemblies 20 are easily achieved. In embodiments, a coming-apart preventing member for preventing the engaging projection 14 from coming apart from the engaging hole 24 can be attached to the engaging projection 14. It is also possible to use a tightening member such as a bolt to fix the engaging projection 14 and the engaging portion 23 with respect to each other.

Alternatively, an adhesive agent can be used to adhere or fix together the engaging projection 14 and the engaging portion 23.

As described above, the engaging holes or slots 24a, 24b can be respectively formed at end portions of the battery assemblies 20, and separated from each other in the vehicle width direction, which can be orthogonal to the direction in which the battery assemblies 20 are stacked. Therefore, because the battery assemblies 20 can be fixed at both end portions of the battery assemblies 20, stable holding of the battery assemblies 20 can be achieved.

In the above, an example is described in which the engaging holes or slots or openings 24a, 24b can be formed respectively at the end portions of the battery assemblies 20 and engage engaging projections 14a, 14b. Alternatively, one or more additional engaging holes or slots, and corresponding one or more engaging projections, can be formed and included in the power source supporting mechanism 10.

As described above, attachment to the crankcase 51 of the power source supporting mechanism can be achieved using the tightened or attachment portions 13 projecting toward the crankcase 51 from the seat portion body 12. Therefore, the attachment of the power source supporting mechanism 10 to the crankcase 51 is easily achieved.

As further described above, the plurality of batteries 21 can be molded together into a panel or block with the mold resin 22. Therefore, mutual collision of the plurality of batteries 21 can be restrained. By molding the plurality of batteries 21 together as described, the shape of the battery assemblies 20 can be changed adequately. Therefore, adjustment of the shape of the battery assemblies 20 according to the shape of the power source supporting mechanism 10 is easily achieved.

Moreover, by molding the batteries 21 together with the mold resin 22, protection of the batteries 21 can be achieved. For example, the batteries 21 can be effectively prevented from being damaged due to the collision between the battery assemblies 20 and other components of the motorcycle.

In addition, by integrating the plurality of batteries 21 together using a mold, easy handling of the plurality of batteries 21 can be achieved.

In general, available space is likely to be formed above the crankcase 51. In particular, for example, the engine 50 having the throttle body 63 as illustrated in FIG. 3 can be formed with a relatively large available space between the throttle body 63 and the crankcase 51, in comparison with an engine which employs a carburetor. As described above, the power source supporting mechanism 10 can be arranged in the available space between the throttle body 63 and the crankcase 51. Therefore, the available space between the crankcase 51 and the throttle body 63 can be effectively utilized.

When the power source supporting mechanism 10 is arranged between the crankcase 51 and the throttle body 63 as described above, the exhaust pipe 60 can be positioned on a side of the power source supporting mechanism 10. In this case, the temperature of the battery assemblies 20 may increase due to heat discharged from the exhaust pipe 60. To handle this, the heat-shielding member 30 can be arranged between the battery assemblies 20 and the exhaust pipe 60 as described above. Therefore, transfer of the heat from the exhaust pipe 60 to the battery assemblies 20 and resulting temperature increase of the battery assemblies 20 can be restrained.

Embodiments of the invention can include additional or alternative power sources to the plurality of batteries 21 described above. For example, the power source can be or include a capacitor.

In the above description, the battery assemblies 20 can each comprise a plurality of substantially column-shaped or cylindrical batteries 21. Alternatively or additionally, the use of other kinds of batteries is possible. For example, the batteries 21 can have a substantially rectangular parallelepiped shape.

In the above description, the power source supporting mechanism 10 can be attached to the crankcase 51. However, as further described above, the power source supporting mechanism 10 can be attached in any suitable space and is not limited to being attached to the crankcase 51.

Further, in the above description, the motorcycle 1 illustrated in FIG. 3 is of the off-road type. However, the power source supporting mechanism 10 can be used with various types of vehicles, such as motorcycles for racing, mopeds, and scooters.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes and adaptations, and the same are intended to be comprehended within the meaning and range of equivalents of the appended claims.

What is claimed is:

1. A power source supporting mechanism for a motorcycle comprising:
    a seat portion to be attached to a vehicle body of the motorcycle;
    a plurality of stackable power sources each including engaging openings; and
    a fixing portion extending from the seat portion and securing the stackable power sources, the fixing portion including at least two engaging projections projecting from the seat portion and each engaging one of the engaging openings of each stackable power source,
    the at least two engaging projections each being arranged on a respective end of the seat portion and extending perpendicularly to the seat portion,
    wherein the at least two engaging projections and the seat portion form a u-shape.

2. The power source supporting mechanism for a motorcycle according to claim 1, wherein the at least two engaging projections project from the seat portion toward the plurality of power sources, and
    the engaging openings of each of the power sources includes a first engaging opening formed at one end portion of the respective power source for allowing insertion of one of the at least two engaging projections and a second engaging opening formed at another end portion of the respective power source for allowing insertion of another one of the at least two engaging projections.

3. The power source supporting mechanism for a motorcycle according to claim 1, wherein the seat portion includes:
    a seat portion body; and
    an attachment portion for attachment to the motorcycle.

4. The power source supporting mechanism for a motorcycle according to claim 1, wherein each of the power sources includes a plurality of batteries, a molding material for grouping the plurality of batteries together into a block, and an engaging portion attached to the block and having the engaging openings formed therein.

5. A motorcycle comprising a power source supporting mechanism according to claim 1.

6. The motorcycle according to claim 5, further comprising:
    an engine having a crankcase and a cylinder block attached to the crankcase;
    a throttle body connected to the cylinder block and arranged above the crankcase,
    the power source supporting mechanism being arranged between the throttle body and the crankcase, and the seat portion being attached to an upper surface of the crankcase.

7. The motorcycle according to claim 6, further comprising:
    an exhaust pipe connected to the cylinder block and positioned at a side of the power source; and
    a heat-shielding member arranged between the exhaust pipe and the power source.

8. The power source supporting mechanism of claim 1, wherein each engaging projection passes entirely through each corresponding engaging opening.

9. The power source supporting mechanism of claim 1, wherein one of the engaging projections engages a plurality of the engaging openings.

10. The power source supporting mechanism of claim 1, wherein each engaging opening is positioned at a different location on a corresponding one of the engaging projections than every other engaging opening positioned on the corresponding engaging projection.

11. A power source system for a vehicle, comprising:
    a support mechanism for receiving a plurality of stacked power sources and including at least two engaging projections, the support mechanism including a seat portion with a first of the at least two engaging projections formed at an end thereof, and a second of the at least two engaging projections formed at another end thereof, the at least two engaging projections extending perpendicularly to the seat portion; and
    a plurality of stacked power sources each including engaging portions for engaging the at least two engaging projections, wherein the engaging portions each include a receiving aperture for mating with a corresponding one of the at least two engaging projections,
    wherein the support mechanism is u-shaped.

12. The power source system of claim 11, further comprising at least one attachment portion projecting from the seat portion, for fastening the support mechanism to a vehicle body.

13. The power source system of claim 11, wherein each power source includes a plurality of batteries.

14. The power source system of claim 13, wherein for each power source the plurality of batteries are formed into a block that is sized to fit the seat portion.

15. The power source system of claim 14, wherein the engaging portions are formed on respective ends of each block.

16. The power source system of claim 15, wherein the blocks are supported on the seat portion and secured via engagement of the engaging portions with the first and second engaging projections.

17. The power source system of claim 11, wherein the vehicle is a motorcycle.

18. The power source system of claim 13, wherein each of the batteries has a cylindrical shape.

19. The power source system of claim 14, wherein the plurality of batteries of each power source are formed into respective blocks with a molding material.

20. The power source system of claim 11, wherein each engaging projection passes entirely through each corresponding receiving aperture.

21. The power source system of claim 11, wherein one of the engaging projections mates with a plurality of the receiving apertures.

22. The power source system of claim 11, wherein each engaging portion is positioned at a different location on the corresponding engaging projection than every other engaging portion positioned on the corresponding engaging projection.

23. A power source supporting mechanism for a motorcycle comprising:
- a seat portion attached to a vehicle body of the motorcycle, wherein the seat portion includes a seat portion body and an attachment portion attached to the vehicle body of the motorcycle;
- a plurality of stackable power sources each including engaging openings; and
- a fixing portion extending from the seat portion and securing the stackable power sources, the fixing portion including at least two engaging projections projecting from the seat portion and each engaging one of the engaging openings of each stackable power source,
- the at least two engaging projections each being arranged on a respective end of the seat portion and extending perpendicularly to the seat portion,
- wherein the attachment portion projects closer towards the vehicle body than the seat portion body,
- the seat portion body touching one of the stackable power sources so as to support the stackable power sources while the attachment portion does not touch the stackable power sources.

24. A power source system for a vehicle, comprising:
- a support mechanism for receiving a plurality of stacked power sources and including at least two engaging projections, the support mechanism including a seat portion with a first of the at least two engaging projections formed at an end thereof, and a second of the at least two engaging projections formed at another end thereof, the at least two engaging projections extending perpendicularly to the seat portion; and
- a plurality of stacked power sources each including engaging portions for engaging the at least two engaging projections, wherein the engaging portions each include a receiving aperture for mating with a corresponding one of the at least two engaging projections,
- wherein the seat portion includes an attachment portion and a seat portion body,
- the attachment portion attaching to a vehicle body of the vehicle and projecting closer towards the vehicle body than the seat portion body,
- the seat portion body touching one of the stacked power sources so as to support the stacked power sources while the attachment portion does not touch the stacked power sources.

* * * * *